(12) United States Patent
Freiberger

(10) Patent No.: US 8,121,111 B2
(45) Date of Patent: Feb. 21, 2012

(54) METHOD AND SYSTEM FOR MEASURING LATENCY

(75) Inventor: Michael B. Freiberger, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

(21) Appl. No.: 11/693,211

(22) Filed: Mar. 29, 2007

(65) Prior Publication Data

US 2008/0240077 A1     Oct. 2, 2008

(51) Int. Cl.
*H04L 12/28* (2006.01)
(52) U.S. Cl. .................................. 370/351; 370/252
(58) Field of Classification Search .................. None
See application file for complete search history.

(56) References Cited

U.S. PATENT DOCUMENTS

| | | | | |
|---|---|---|---|---|
| 6,330,236 B1* | 12/2001 | Ofek et al. | ..................... | 370/369 |
| 6,477,181 B1* | 11/2002 | Fujimori et al. | ............... | 370/476 |
| 6,532,274 B1* | 3/2003 | Ruffini | ........................... | 375/356 |
| 2001/0002195 A1* | 5/2001 | Fellman et al. | ................ | 370/420 |
| 2002/0018475 A1* | 2/2002 | Ofek et al. | ..................... | 370/400 |
| 2002/0196801 A1* | 12/2002 | Haran et al. | ................... | 370/432 |
| 2003/0115321 A1* | 6/2003 | Edmison et al. | ............. | 709/224 |

* cited by examiner

*Primary Examiner* — Chi Pham
*Assistant Examiner* — Kouroush Mohebbi

(57) ABSTRACT

A system and method for measuring latency of an optical transport network includes generating a time stamp, transmitting the time stamp in an optical transport network, and processing the time stamp to measure latency of the optical transport network.

33 Claims, 7 Drawing Sheets

OVERHEAD 301

| COLUMN NUMBER | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| FRAME ALIGNMENT OVERHEAD 401 | | | | | | | OTU OVERHEAD 402 | | | | | | | OPU OVERHEAD 404 | |
| | | | | | | | ODU OVERHEAD 403 | | | | | | | | |

ROW NUMBER: 1, 2, 3, 4

FIG. 4

METHOD AND SYSTEM FOR MEASURING LATENCY

BACKGROUND

Communication networks of today often provide communication via digitally wrapped packet transmissions. There are many framed communication protocols in use and these protocols may be arbitrary or supported by an underlying function. A communication network may have one or more nodes which may transfer data streams over a communication channel. Many applications enabled by such a communication network may be latency sensitive and therefore may require a particular latency. However, latency measurement within a communication network may be disruptive of the transmission of data. Oftentimes, personnel may be required to test latency, thereby further complicating the process.

BRIEF DESCRIPTION OF THE DRAWINGS

In order to facilitate a fuller understanding of exemplary embodiments, reference is now made to the appended drawings. These drawings should not be construed as limiting, but are intended to be exemplary only.

FIG. 4 illustrates an exemplary overhead area of an interface for an optical transporting network system, according to an exemplary embodiment.

DETAILED DESCRIPTION OF PREFERRED EMBODIMENTS

An exemplary embodiment of the present invention provides a system and process for monitoring delay within a network system. In one embodiment of the present invention, the network system may include synchronized network elements to facilitate measurement of latency of the network system. For example, latency of a network may refer to measurement of one-way latency which measures the time from a source transmitting data to a destination receiving the data. Latency of a network may also refer to the measurement of round-trip latency which measures one-way latency from a source to a destination plus one-way latency from the destination back to the source.

Latency measurement for an Optical Transport Network may have various applications. For example, a predetermined latency measure between two nodes may be established as a default latency measure between two nodes. A variance in latency measure from the default latency measure between the two nodes in an Optical Transport Network may indicate with a change in the length of telecommunication line linking the two nodes. Also, a variance in latency measure from between two nodes in an Optical Transport Network may indicate certain events. For example, an illegal tapping by an entity may cause a delay in the Optical Transport Network and thus may lead to a variance in the latency measure. Other various applications associated with latency measure for an Optical Transport Network may be implemented.

Figure 1:
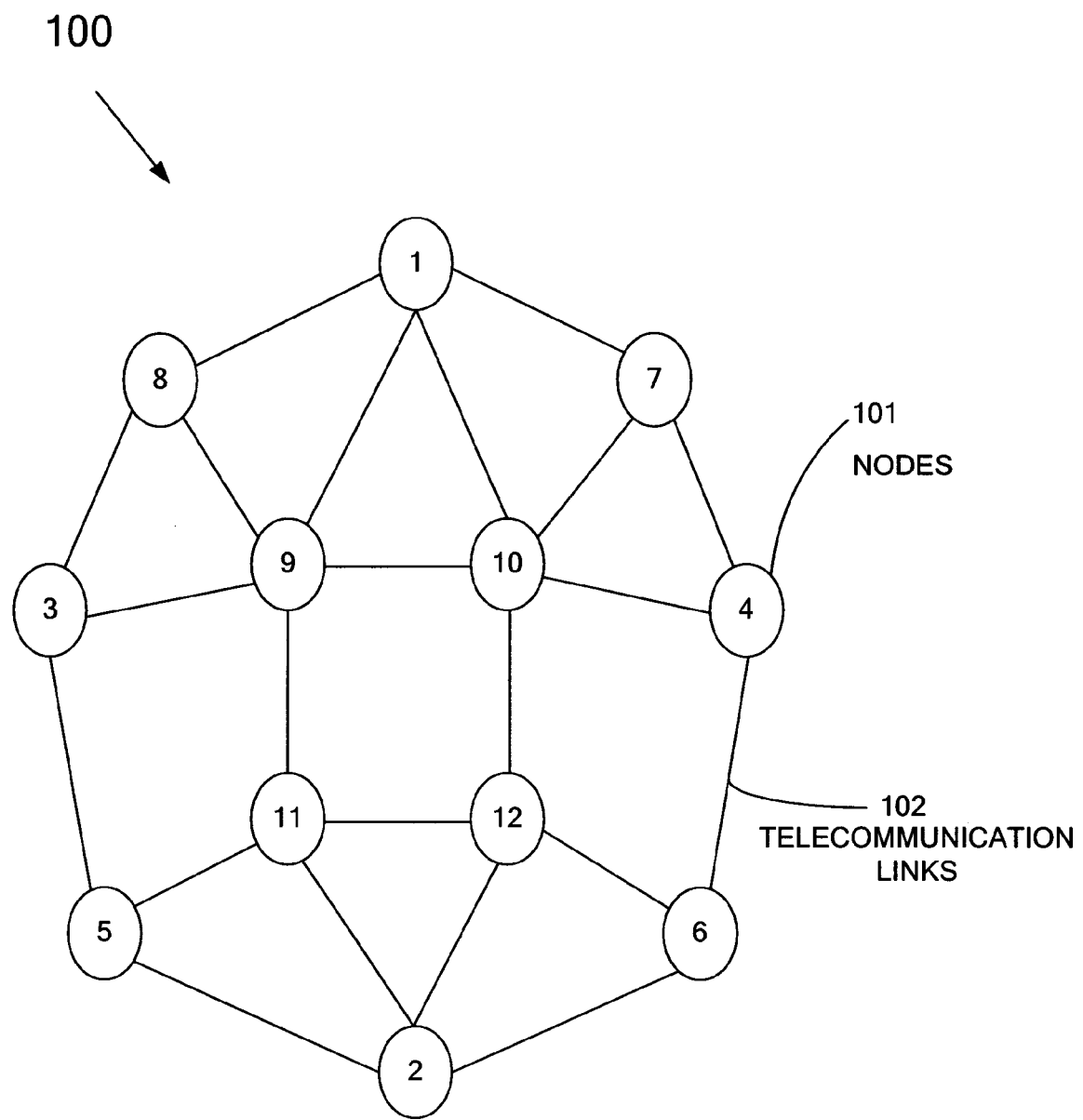
FIG. 1 illustrates an exemplary optical transporting network system, according to an exemplary embodiment.

FIG. 1 is an exemplary network system, according to an exemplary embodiment. System 100 illustrates an exemplary system for an Optical Transport Network (OTN) which may implement a variety of standards of interface for managing optical wavelengths. For example, various standards of interface for managing the transmission of data within an Optical Transport Network may include a synchronous digital hierarchy standard (SDH) developed by the International Telecommunication Union (ITU), a synchronous optical networking (SONET) standard developed by Telcordia Technologies and/or other standards. A standard developed by the International Telecommunication Union is G.709 which may enable the use of optical switches without the optical/electrical/optical (O/E/O) conversions while compensating for data corruption due to impurities in optical equipments of the Optical Transport Network (OTN). In an exemplary embodiment, ITU-T G.709, a standard recommended by the International Telecommunication Union Telecommunication Standardization Sector may be used to enable the management of optical wavelength in an Optical Transport Network (OTN). Other Standards may also be implemented.

As illustrated, System 100 may include a plurality of Nodes 101 coupled by a network of Telecommunications Links 102. A network of Nodes 101 and Telecommunication Links 102 may be arranged to enable transmission of data from a source node to a receiving node over a single or multiple telecommunication links. For example, a transmission of data from Node 1 to Node 2 as illustrated in FIG. 1 may be enabled by transmission via plurality of intermediate Node 10 and Node 12 and/or Node 9 and Node 11. Various different paths of transmission between a source node and a termination node may be enabled by different intermediate nodes within the Optical Transport Network (OTN).

Node 101 may be a source node where transmission of data commences, a termination node where transmission of data terminates, and/or an intermediate node where transmission of data may traverse. Node 101 may implement various network elements to enable transmission of data between each node.

Telecommunication Link 102 may be a communication channel that may connect two or more network elements. Telecommunication Link 102 may be a physical telecommunication link or multiple of physical telecommunication links or a logical telecommunication link. Telecommunication Link 102 may be a point-to-point link, a multipoint link, a point-to multipoint link, or a combination of different types of links mentioned before. In an exemplary embodiment, an optical fiber may include glass and/or plastic fiber to guide light may be used for Telecommunication Link 102. Various types of optical fiber may be used for Telecommunication Link 102 which may include, without limitation, multi-mode optical fibers, single-mode optical fibers, graded-index fibers, step-index optical fiber or a combination of the different types of optical fiber mentioned before.

Figure 2:
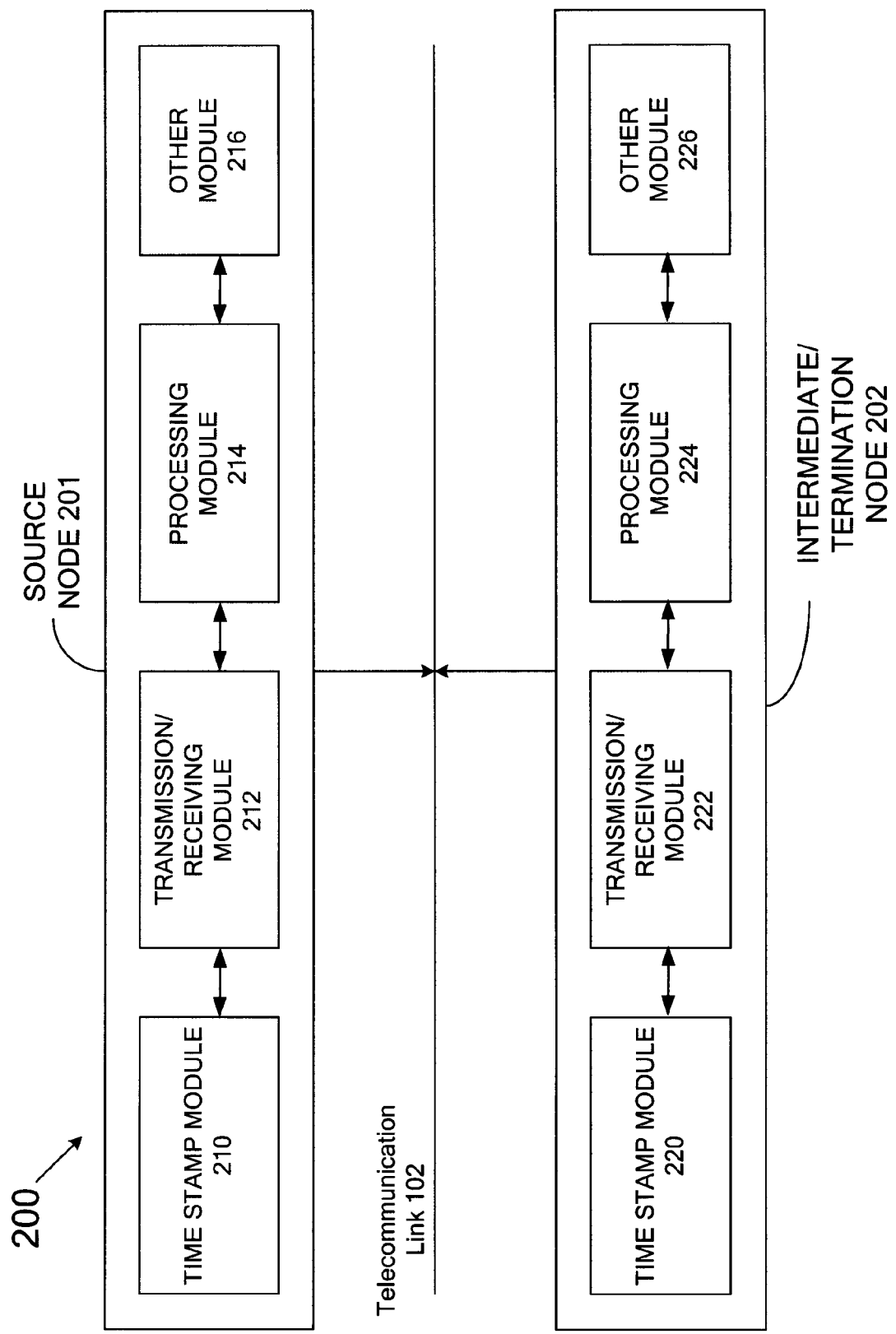
FIG. 2 illustrates an exemplary system to measure the latency of an optical transporting network system, according to an exemplary embodiment.

FIG. 2 illustrates an exemplary system 200 for measuring the latency of an Optical Transporting Network (OTN), according to an exemplary embodiment. Latency measuring system 200 may include a Source Node 201 and/or one or more Intermediate/Termination Node 202. Source Node 201 may represent a node sending a data packet. Intermediate/

Termination Node 202 may represent a node receiving a data packet. In an exemplary embodiment, Source Node 201 may include a Time Stamp Module 210, a Transmission/Receiving Module 212, a Processing Module 214 and/or Other Module 216. Source Node 201 may communicate with Intermediate/Termination Node 202 via one or more links, as shown by Telecommunication Link 102. Intermediate/Termination Node 202 may include a Time Stamp Module 220, a Transmission/Receiving Module 222, a Processing Module 224 and/or Other Module 226. Each node may include additional modules, as shown by Other Module 216 and 226. In addition, the modules at each node may be combined, duplicated, separated and/or otherwise modified based on various applications and preferences. Other architectures and implementations may be realized.

In an exemplary embodiment, Source Node 201 may initiate a process for measuring latency of an Optical Transporting Network (OTN). Time Stamp Module 210 of Source Node 201 may generate a first time stamp such as a counter, trusted time stamp, digital postmark, digital time stamp and/or any signal or algorithms which may keep time. The first time stamp may be associated with a time tracking device at Source Node 201. The time tracking device may include one or more various types of time tracking devices and/or a clock network which may enable time synchronization at each node of the Optical Transporting Network (OTN).

The first time stamp may be transmitted to Transmission/Receiving Module 212 where Transmission/Receiving Module 212 may associate the first time stamp with an Optical Transport Unit (OTU) frame. Further, Transmission/Receiving Module 212 of Source Node 201 may transmit the Optical Transport Unit (OTU) frame with the associated first time stamp to Transmission/Receiving Module 222 at Intermediate/Termination Node 202.

Transmission/Receiving Module 222 may receive the Optical Transport Unit (OTU) frame with the associated first time stamp and extract the first time stamp from the Optical Transport Unit (OTU) frame. The extracted first time stamp may be transmitted to and/or stored in Processing Module 224. Processing Module 224 may include a processing unit, a storage unit and/or other various network elements. Processing Module 224 may include various storage elements to store the first time stamp. In addition, Processing Module 224 may determine one-way latency of the Optical Transporting Network (OTN) based on the information associated with the first time stamp. Further, Processing Module 224 may include without limitation, software, hardware or a combination of software and hardware operable to determine the latency of an Optical Transport Network (OTN). In addition, the software may include, without limitation, algorithms determining latency in an Optical Transport Network (OTN). The hardware may include, without limitation, a processor and/or other similar integrated circuit.

Time Stamp Module 220 at Intermediate/Termination Node 202 may access the first time stamp stored in Processing Module 224 and generate a second time stamp such as a counter, trusted time stamp, digital postmark, digital time stamp and/or any signal or algorithms which may keep time. The second time stamp may be associated with the first time stamp. Also, the second time stamp may be associated with a time tracking device located at Intermediate/Termination Node 202. The time tracking device may include one or more various types of time tracking devices and/or a clock network which may enable time synchronization at each node of the Optical Transporting Network (OTN).

Time Stamp Module 220 may transmit the second time stamp to Transmission/Receiving Module 222. Transmission/Receiving Module 222 may associate the second time stamp in an Optical Transport Unit (OTU) frame and transmit the Optical Transport Unit (OTU) frame with the associated second time stamp to Transmission/Receiving Module 212 at Source Node 201.

Transmission/Receiving Module 212 may receive the Optical Transport Unit (OTU) frame with the associated second time stamp and extract the second time stamp from the Optical Transport Unit (OTU) frame. The extracted second time stamp may be transmitted to and/or stored in Processing Module 214. Processing Module 214 may include a processing unit, a storage unit and/or other various network elements. Processing Module 214 may include various storage elements to store the second time stamp. In addition, Processing Module 214 may determine latency of an Optical Transporting Network (OTN) based on the information associated with the second stamp. Further, Processing Module 214 may include without limitation, software, hardware or a combination of software and hardware operable to determine latency of an Optical Transport Network (OTN). In addition, the software may include, without limitation, algorithms determining latency in an Optical Transport Network (OTN). Further, the hardware may include, without limitation, a processor and/or other similar integrated circuit.

Furthermore, Other Module 216, 226 may include various types of network elements in cooperation with other modules at each node to enable a process to measure latency of an Optical Transporting Network (OTN).

Figure 3:
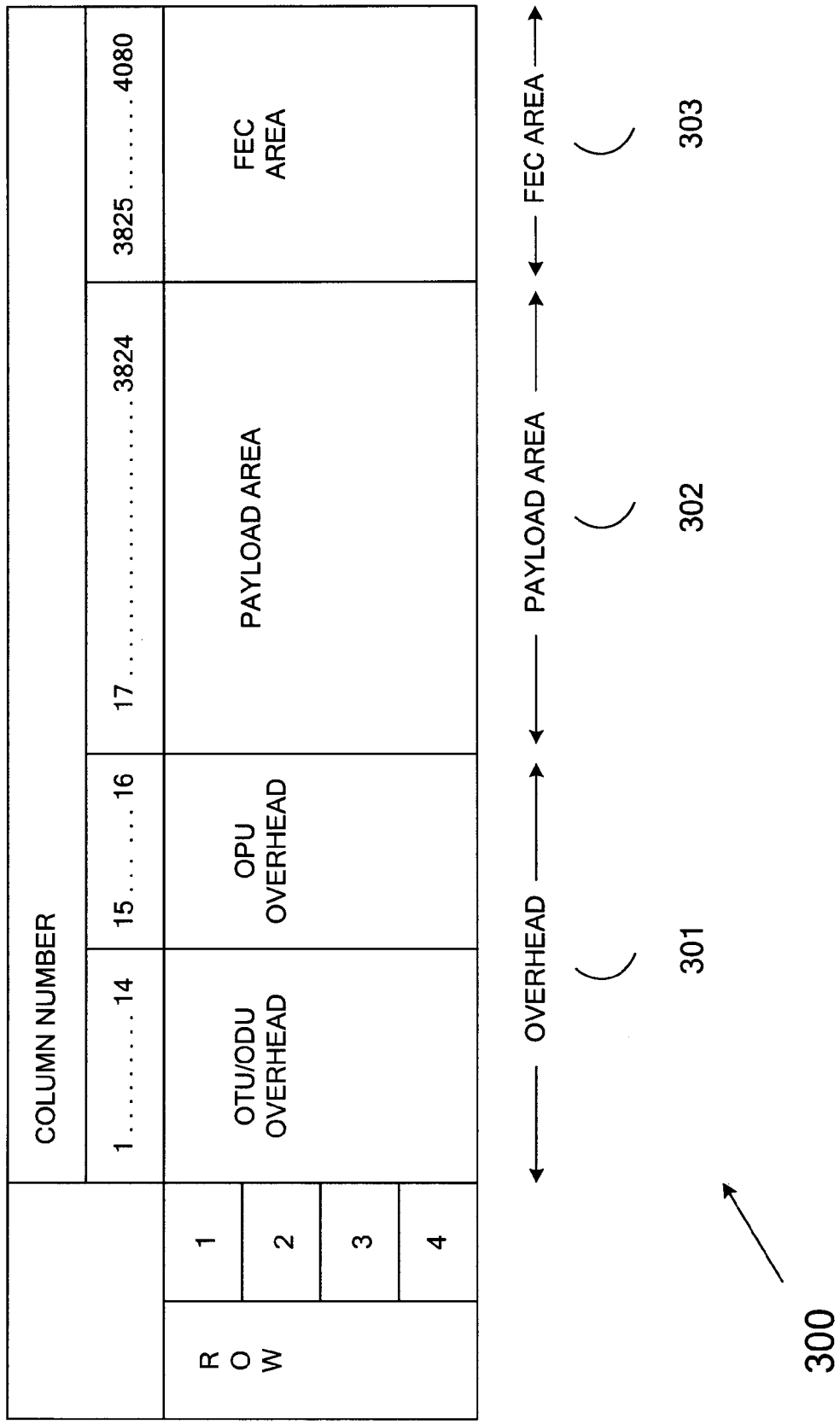
FIG. 3 illustrates an exemplary standard interface for an optical transporting network system, according to an exemplary embodiment.

FIG. 3 illustrates an exemplary Optical Transport Unit (OTU) frame, according to an exemplary embodiment. In this exemplary embodiment, the ITU-T G.709 standard may apply. The various embodiments of the present invention may apply to other standards as well. As illustrated in FIG. 3, an Optical Transport Unit (OTU) frame may include an Overhead 301 for operation, administration, and/or maintenance functions, a Payload 302 for data storage during a transmission and/or Forward Error Correction 303 which may reduce the number of transmission errors on noisy links while enabling the deployment of longer optical spans. Further, Forward Error Correction 303 may include a Reed-Solomon (RS) code to produce redundant information which may be concatenated with the signal to be transmitted. The redundant information generated by the Reed-Solomon (RS) code may enable a receive interface to identify and/or correct any transmission errors.

According to an exemplary embodiment, an Optical Transport Unit (OTU) frame for ITU-T G.709 network interface standard may include four rows of 4080 bytes. Data may be transmitted serially beginning at the top left, first row, and may be followed by the second row and so on. The ITU-T G.709 network interface standard may enable three rates of data transmission, for example, 2,666,057.413 kbit/s—Optical Channel Transport Unit 1 (OTU1) which may have a frame rate of 20.420 kHz or 48.971 ms, 10,709,225.316 kbit/s—Optical Channel Transport Unit 2 (OTU2) which may have a frame rate of 82.027 kHz or 12.191 ms, or 43,018,413.559 kbit/s—Optical Transport Channel Unit 3 (OTU3) which may have 329.489 kHz or 3.035 ms.

FIG. 4 illustrates details for an exemplary Overhead 301 of an Optical Transport Unit (OTU) frame, according to an exemplary embodiment. In this exemplary embodiment, the ITU-T G.709 standard may apply. FIG. 4 illustrates general exemplary components for Overhead 301 of an Optical Transport Unit (OTU) frame for ITU-T G.709 network interface standard. Overhead 301 may include a Frame Alignment Overhead 401, Optical Channel Transport Unit (OTU) Overhead 402, Optical Channel Data Unit (ODU) Overhead 403 and/or Optical Channel Payload Unit (OPU) Overhead 404.

Figure 5:
FIG. 5 illustrates an exemplary detailed overhead area of an interface for an optical transporting network system, according to an exemplary embodiment.

FIG. 5 illustrates detailed exemplary components for Overhead 301 of an Optical Transport Unit (OTU) frame. Frame Alignment Overhead 401 may enable a receiving network element of an Optical Transport Network (OTN) frame to identify a starting point by framing bytes. Frame Alignment Overhead 301 may include a 6-bytes frame alignment signal (FAS) in row 1 columns 1-6. A frame alignment signal (FAS) may enable a receiving network element to identify any out-of-frame (OOF), loss-of-frame (LOF) and/or a start of an Optical Transporting Unit (OTU) frame. In an exemplary embodiment, Overhead 301 may include signals which may span multiple Optical Transport Unit (OTU) frames therefore, Frame Alignment Overhead 401 may include a multi-frame alignment signal (MFAS) byte to identify signals that may span multiple Optical Transport Unit (OTU) frames. The multi-frame alignment signal (MFAS) for Frame Alignment Over head 301 may be defined in row 1 column 6 and/or 7.

Optical Channel Transporting Unit (OTU) Overhead 402 may be located at row 1 columns 8-14, which may provide supervisory functions. Optical Channel Transport Unit (OTU) Overhead 402 may include three bytes section monitoring (SM), two-byte general communications channel (GCC0), and two bytes reserved for future international standardization. The section monitoring (SM) of Optical Channel Transporting Unit (OTU) Overhead 402 may test and/or monitor Overhead Area 301 and/or Payload Area 302. The general communications channel (GCC0) may be defined in row 1 columns 11 and 12 which may provide control of a channel connection between Optical Transport Unit (OTU) frame termination points and/or network management. Optical Channel Transporting Unit (OTU) Overhead 402 may further include a reserved (RES) field located in row 1 column 13 and 14 which may be set aside for future standardization.

Optical Channel Data Unit (ODU) Overhead 403 may reside in rows 2, 3 and 4 of column 1-14 of the Optical Transporting Network (OTN) frame. Optical Channel Data Unit (ODU) Overhead 403 may include multiple tandem connection monitoring (TCM), which may enable a network operator to monitor the transmission of a signal. Optical Channel Data Unit (ODU) Overhead 403 may also include TCM activation (TCM ACT) field which may enable the activation and/or deactivation of tandem connection monitoring (TCM) channels. Optical Channel Data Unit (ODU) Overhead 403 may further include path monitoring (PM) which may function in a similar manner as the section monitor in the Optical Channel Transporting Unit (OTU) Overhead 402 described above except the path monitoring (PM) may provide end-to-end monitoring. Furthermore, Optical Channel Data Unit (ODU) Overhead 403 may include a fault type and fault location (FTFL) which may monitor path level faults, transport both forward and backward fault information and/or a message structure. Moreover, Optical Channel Data Unit (ODU) Overhead 403 may include general communications channel fields GCC1 and GCC2 which may provide clear channel connection between Optical Channel Data Unit (ODU) termination points. In addition, Optical Channel Data Unit (ODU) Overhead 303 may include two reserved (RES) fields which may be used for future standardization and may be located in row 2 column 1-3 and row 4 columns 9-14.

Optical Channel Payload Unit (OPU) Overhead 404 may include justification control (JC) located in column 15 row 1, 2 and 3. The justification control (JC) byte provide for payload movements inside the Optical Transport Network (OTN) frame. Optical Channel Payload Unit (OPU) Overhead 404 may include three justification control bytes where two out of three justification controls may be sufficient to carry out justification events. Two types of justification control (JC) may determine a justification event, for example, a positive justification opportunity (PJO) and/or a negative justification opportunity (NJO). A positive justification opportunity (PJO) may cause one of payload bytes to not contain payload information as a justification event may occur. A negative justification opportunity (NJO) may cause one of payload bytes to temporarily maintain payload information as a justification even may occur. Optical Channel Payload Unit (OPU) Overhead 404 may include payload structure identifier (PSI) which may include payload type (PT) to identify the payload content. The payload structure identifier (PSI) may include one-byte located in row 4, column 15 to transport a 256-byte payload structure identifier (PSI) signal. The payload type (PT) and/or virtual concatenation payload type (vcPT) may be each represented by one-byte in the 256-byte of payload structure identifier (PSI). The rest 254-bytes of payload structure identifier (PSI) may be reserved for future international standardization.

In an exemplary embodiment, a time stamp may be associated with an Optical Transporting Unit (OTU) frame. The time stamp may be inserted within an Overhead 301 of an Optical Transporting Unit (OTU) frame. The size of a time stamp may vary. For example, amount, size or type of information associated with the time stamp may affect the size of the time stamp. In addition, other factors may be considered. Therefore, a time stamp may be inserted within different locations of Overhead 301 depending on the characteristics, size, amount, type, etc., of the time stamp. In an exemplary embodiment, a time stamp may be inserted in Frame Alignment Overhead 401, Optical Channel Transporting Unit (OTU) Overhead 402, Optical Channel Data Unit Overhead 403 and/or Optical Channel Payload Unit Overhead 404. For example, a time stamp may be inserted within Frame Alignment Overhead 401, wherein a reserved space may be available in a frame alignment signal (FAS) and/or a multi-frame alignment signal (MFAS). Also, a time stamp may be inserted within a reserved space in Optical Channel Transport Unit (OTU) Overhead 402 located at row 1 columns 13 and 14. Further, a time stamp may be inserted within a reserved space in Optical Channel Data Unit (ODU) Overhead 403 located at row 2 columns 1, 2 and 3, and/or row 4 columns 9, 10, 11, 12, 13 and 14. Furthermore, a time stamp may be inserted within a reserved space in Optical Channel Payload Unit (OPU) Overhead 304 located at column 15 rows 1, 2, 3 and 4 and/or column 16 rows 1, 2, 3 and 4. Moreover, a time stamp may be inserted in any reserved space located in column 17. An Optical Transporting Unit (OTU) frame with inserted time stamp may be transmitted over an Optical Transporting Network (OPN) to an intermediate and/or termination node. In addition, information associated with the time stamp may be spread across multiple locations. Other various locations may be used for the time stamp.

In an exemplary embodiment, the ITU-T G.709 network interface standard may enable virtual concatenation which may enable a channel within a group to travel on different physical paths through an Optical Transport Network (OTN). Virtual concatenation (VOCH) overhead which may be specific in each individual Optical Transport Unit (OTU) frame. Optical Channel Payload Unit (OPU) Overhead 304 may include three-byte of virtual concatenation overhead (VCOH) which may be located at column 15, row 1, 2 and 3. Three bytes per individual Optical Channel Payload Unit (OPU) Overhead 304 may be utilized to transport a 3 byte×32 frame structure for virtual concatenation specific overhead. The virtual concatenation overhead (VCOH) for the Optical Channel Payload Unit (OPU) Overhead 404 may also include a reserved field for future international standardization.

Figure 6:
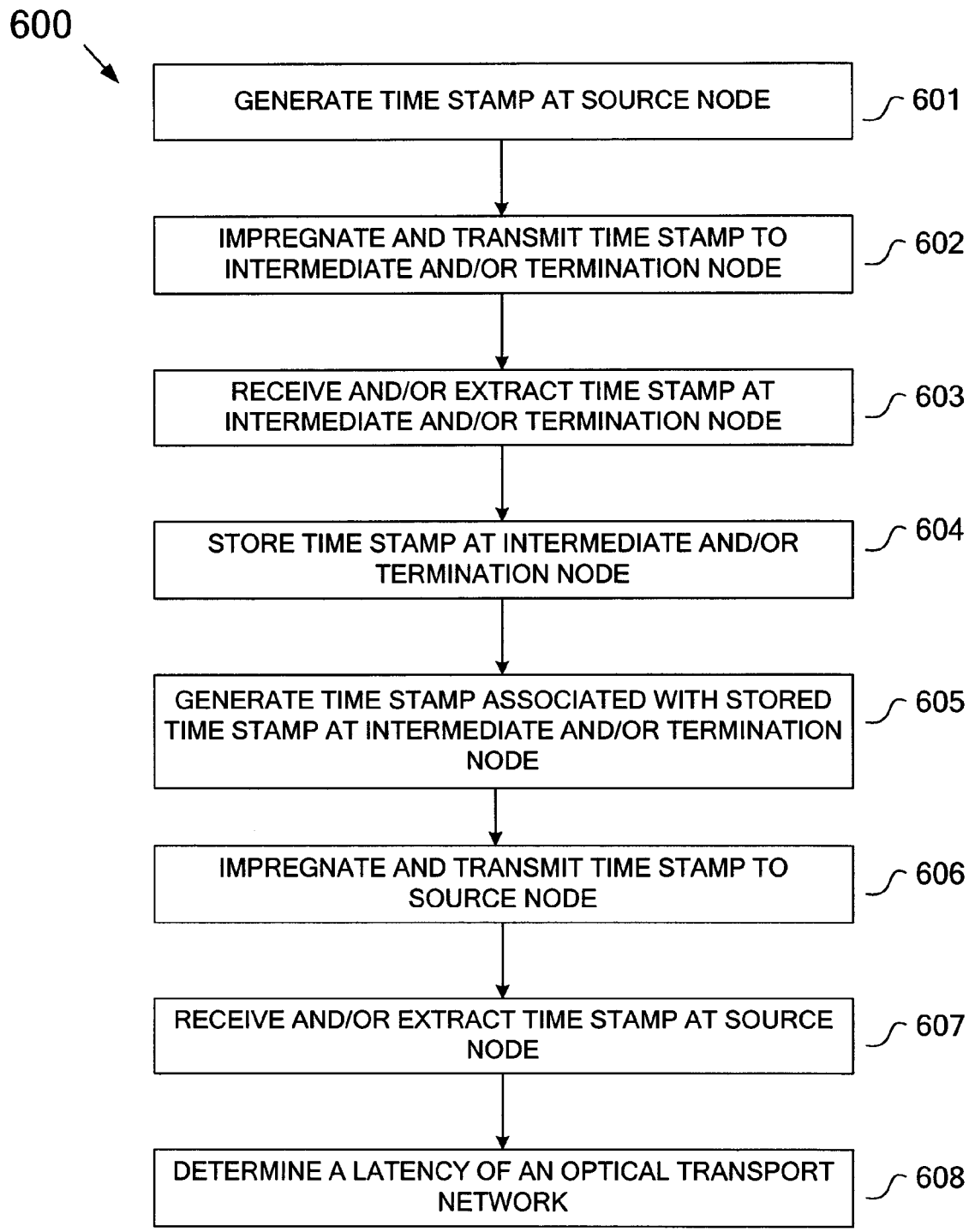
FIG. 6 is a flow chart illustrating an exemplary process of measuring the latency of an optical transporting network system, according to an exemplary embodiment.

FIG. 6 is a flow chart 600 which illustrates an exemplary method of measuring latency of an Optical Transporting Network (OTN). At block 601, a time stamp module may generate a first time stamp. The first time stamp may correspond to a time tracking device associated with a source node.

At block 602, the first time stamp may be associated with an Optical Transporting Unit (OTU) frame and transmitted to an intermediate/termination node. For example, the first time stamp may be inserted within an Overhead Area of an Optical Transport Unit (OTU) frame as mentioned above.

At block 603, a transmission/receiving module at an intermediate/termination node may receive the Optical Transporting Unit (OTU) frame with the associated first time stamp. The transmission/receiving module at the intermediate/termination node may extract the first time stamp from an Overhead Area of the Optical Transporting Unit (OTU) frame.

At block 604, the transmission/receiving module at the intermediate/termination node may transfer the extracted first time stamp to a processing module at the intermediate/termination node. The processing module may store the first time stamp in a storage unit.

At block 605, a time stamp module at the intermediate/termination node may access a storage unit associated with the processing module to obtain information associated with the first time stamp. The time stamp module at the intermediate/termination node may generate a second time stamp associated with the information of the first time stamp.

At block 606, the second time stamp generated at the intermediate/termination node may be associated with an Optical Transporting Unit (OTU) frame and transmitted back to the source node. For example, the second time stamp may be inserted within an Overhead Area of an Optical Transport Unit (OTU) frame as mentioned above.

At block 607, the transmission/receiving module at the source node may receive the Optical Transporting Unit (OTU) frame with the associated second time stamp. For example, the transmission/receiving module at the source node may extract the second time stamp from an Overhead Area of the Optical Transporting Unit (OTU) frame.

At block 608, a processing module may store the second time stamp. The processing module may also determine the latency of an Optical Transporting Network. The second time stamp may include information associated with the first time stamp. For example, the information may include the time when the first time stamp may have been generated and/or transmitted. The processing module may determine the amount of time elapsed from the time the first time stamp may be generated and/or transmitted to determine the latency of the Optical Transporting Network (OTN). Also, the second time stamp may include a time counter or other time tracking device. The time counter may increment by a predetermined period of time. Accordingly, the processing module may determine latency of the Optical Transporting Network (OTN) based on the increment of the time counter.

In an exemplary embodiment, transmission between a source node and a termination node may traverse through one or more intermediate nodes along a transmission path. The one or more intermediate nodes may enable passage of an Optical Transport Unit (OTU) frame with the associated time stamp. Also, an intermediate node may generate one or more intermediate time stamps at each intermediate node according to the process mentioned above and transmit one or more intermediate time stamps to a subsequent intermediate node.

Figure 7:
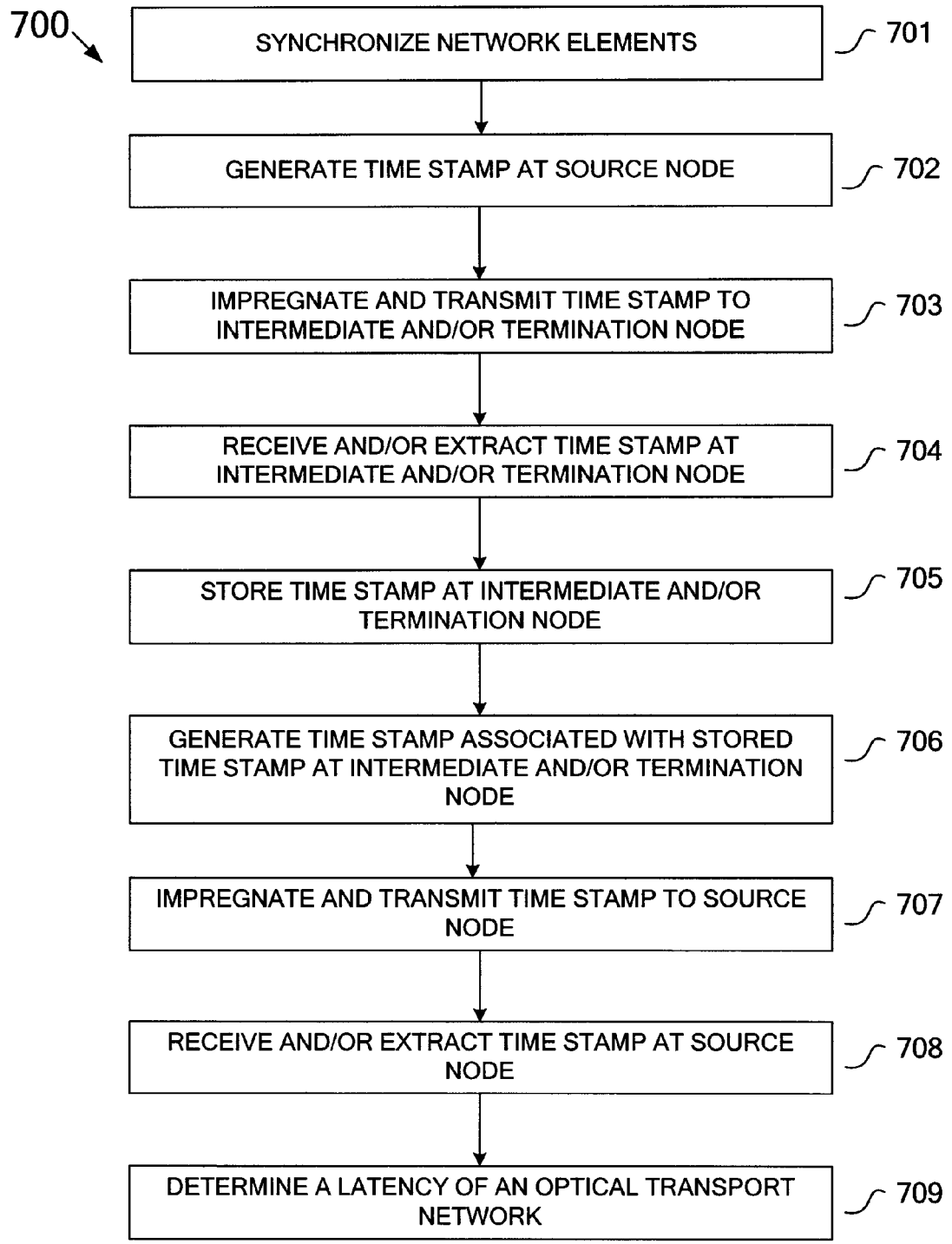
FIG. 7 is a flow chart illustrating an exemplary process of measuring the latency of a synchronized optical transporting network system, according to an exemplary embodiment.

FIG. 7 depicts a flow chart 700 which illustrates an exemplary method of measuring the latency of a synchronized Optical Transporting Network (OTN). At block 701, the time at a plurality of nodes in an Optical Transporting Network (OTN) may be synchronized. For example, a clock network may enable the plurality of nodes to display the same or synchronized time. Also, the time for the node at two end points of a transmission and/or any intermediate nodes along a transmission path may be synchronized. The plurality of nodes may be synchronized by setting the source node as a default/master clock while a termination node and/or one or more intermediate nodes may be a slave clock which may display the time of the master clock. Further, the nodes may be synchronized by setting an arbitrary node in the Optical Transport Network (OTN) as a master clock while a source, a termination, and/or an intermediate node may be a slave clock which may display the time of the master clock.

At block 702, a time stamp module may generate a first time stamp. The first time stamp generate may correspond to a time tracking device associated with a source node.

At block 703, the first time stamp may be associated with an Optical Transporting Unit (OTU) frame and transmitted to an intermediate/termination node. For example, the first time stamp may be inserted within an Overhead Area of an Optical Transport Unit (OTU) frame as mentioned above.

At block 704, a transmission/receiving module at an intermediate/termination node may receive the Optical Transporting Unit (OTU) frame with the associated first time stamp. The transmission/receiving module at the intermediate/termination node may extract the first time stamp from an Overhead Area of the Optical Transporting Unit (OTU) frame.

At block 705, the transmission/receiving module at the intermediate/termination node may transfer the extracted first time stamp to a processing module at the intermediate/termination node. The processing module may store the first time stamp in a storage unit.

At block 706, a time stamp module at the intermediate/termination node may access a storage unit associated with the processing module to obtain information associated with the first time stamp. The time stamp module at the intermediate/termination node may generate a second time stamp associated with the information of the first time stamp.

At block 707, the second time stamp generated at the intermediate/termination node may be associated with an Optical Transporting Unit (OTU) frame and transmitted back to the source node. For example, the second time stamp may be inserted within an Overhead Area of an Optical Transport Unit (OTU) frame as mentioned above.

At block 708, the transmission/receiving module at the source node may receive the Optical Transporting Unit (OTU) frame with the associated second time stamp. For example, the transmission/receiving module at the source node may extract the second time stamp from an Overhead Area of the Optical Transporting Unit (OTU) frame.

At block 709, a processing module may store the second time stamp. The processing module may also determine the latency of an Optical Transporting Network. The second time stamp may include information associated with the first time stamp. For example, the information may include the time when the first time stamp may have been generated and/or transmitted. The processing module may determine the amount of time elapsed from the time the first time stamp may be generated and/or transmitted to determine the latency of the Optical Transporting Network (OTN). Also, the second time stamp may include a time counter or other time tracking device. The time counter may increment by a predetermined period of time. Accordingly, the processing module may determine latency of the Optical Transporting Network (OTN) based on the increment of the time counter.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving a first time stamp associated with a first location at a second location, wherein the first time stamp is inserted in a first overhead of a first optical transport unit frame;
   extracting information of the first time stamp from the first overhead of the first optical transport unit frame, wherein the information reflects a round trip delay of a network;
   generating a second time stamp based at least in part on the extracted information of the first time stamp associated with the first location, wherein the second time stamp includes at least part of the extracted information of the first time stamp; and
   transmitting the second time stamp in a second overhead of a second transport unit frame to the first location wherein the second time stamp is used to measure the round trip delay of the network.

2. The method according to claim 1, wherein generating the second time stamp comprises generating a second time counter.

3. The method according to claim 2, wherein generating the second time counter is associated with the first time stamp.

4. The method according to claim 1, wherein the transmission of the second time stamp comprises associating the second time stamp with a digital wrapping circuit.

5. The method according to claim 4, further comprises the second time stamp associated with an overhead portion of the digital wrapping circuit.

6. A method, comprising:
   generating a first time stamp associated with the first location;
   transmitting the first time stamp associated with the first location in a first overhead of a first optical transport unit frame to a second location via a network, wherein the first time stamp comprises information reflecting a round trip delay of the network;
   receiving a second time stamp associated with the second location in a second overhead of a second optical transport unit frame, wherein the second time stamp includes at least part of the information of the first time stamp extracted from the first overhead of the first optical transport unit frame; and
   processing the second time stamp associated with the second location to measure the round trip delay of the network.

7. The method according to claim 6, wherein generating the first time stamp associated with a first location comprises generating a time counter.

8. The method according to claim 6, wherein transmitting the first time stamp associated with the first location comprises associating the first time stamp with the first location in a digital wrapping circuit.

9. The method according to claim 8, further comprises associating the first time stamp with the first location in an overhead portion of the digital wrapping circuit.

10. The method according to claim 6, wherein processing the second time stamp associated with the second location further comprises:
    determining the round trip delay of the network based at least in part on the second stamp associated with the second location.

11. The method according to claim 6, further comprises:
    synchronizing network elements at the first location and the second location.

12. A system, comprising:
    a receiving module to receive a first time stamp associated with a first location inserted in a first overhead of a first optical transport unit frame at a second location and extract information of the first time stamp from the first overhead of the first optical transport unit frame, wherein the information of the first time stamp reflects a round trip delay of a network;
    a processing module comprising a computer processor to store the information of the first time stamp from the first overhead of the first optical transport unit frame;
    a generating module to generate a second time stamp based at least in part on the extracted information of the first time stamp associated with the first location, wherein the second time stamp includes at least part of the extracted information of the first time stamp;
    a transmission module to transmit the second time stamp in a second overhead of a second optical transport unit frame to the first location via the network to measure the round trip delay of the network.

13. The system according to claim 12, wherein the generating module generates a second time counter.

14. The system according to claim 12, wherein the transmission module associates the second time stamp associated with the second location with a digital wrapping circuit.

15. The system according to claim 14, wherein the transmission module associates the second time stamp associated with the second location with an overhead portion of the digital wrapping circuit.

16. A system, comprising:
    a generating module to generate a first time stamp associated with the first location;
    a transmission module to transmit the first time stamp associated with the first location in a first overhead of a first optical transport unit frame to a second location via a network, wherein the first time stamp comprises information reflecting a round trip delay of the network;
    a receiving module to receive a second time stamp inserted in a second overhead of a second optical transport unit frame associated with the second location, wherein the second time stamp includes at least part of information of the first time stamp extracted from the first overhead of the first optical transport unit frame; and
    a processing module comprising a computer processor to process the second time stamp associated with the second location to measure the round trip delay of the network.

17. The system according to claim 16, wherein the generating module generates a time counter for the first time stamp associated with the first location.

18. The system according to claim 16, wherein the transmission module associates the first time stamp associated with the first location with a digital wrapping circuit.

19. The system according to claim 18, wherein the transmission module associates the first time stamp associated with the first location with an overhead portion of the digital wrapping circuit.

20. The system according to claim 16, wherein the processing module calculates the round trip delay of the network based at least in part on the second time stamp associated with the second location.

21. The system according to claim 16, wherein the network elements at the first location and the second location are synchronized.

22. A method, comprising:
generating a first time stamp associated with the first location;
transmitting the first time stamp associated with the first location in a first overhead of a first optical transport unit frame to a second location via a network, wherein the first time stamp comprises information reflecting a round trip delay of the network;
receiving a first time stamp associated with a first location at a second location;
extracting information of the first time stamp from the first overhead of the first optical transport unit frame;
generating a second time stamp based at least in part on the extracted information of the first time stamp associated with the first location, wherein the second time stamp includes at least part of the extracted information of the first time stamp;
transmitting the second time stamp in a second overhead of a second optical transport unit frame to the first location;
receiving a second time stamp associated with the second location at the first location; and
processing the second time stamp associated with the second location to measure the round trip delay of the network.

23. A non-transitory computer readable storage media comprising code to perform the acts of the method of claim 1.

24. A non-transitory computer readable storage media comprising code to perform the acts of the method of claim 6.

25. A non-transitory computer readable storage media comprising code to perform the acts of the method of claim 22.

26. A method, comprising:
receiving a first time stamp associated with a first location in a first overhead of a first optical transport unit frame at a second location during a first data transmission;
extracting information of the first time stamp from the first overhead of the first optical transport unit frame, wherein the information reflects a round trip delay of a network;
generating a second time stamp based at least in part on the extracted information of the first time stamp associated with the first location, wherein the second time stamp includes at least part of the extracted information of the first time stamp; and
transmitting the second time stamp in a second overhead of a second optical transport unit frame to the first location during a second data transmission wherein the second time stamp is used to measure the round trip delay of the network.

27. The method according to claim 26, wherein the first data transmission comprises transmitting a first data packet wherein the first data packet comprises the first time stamp.

28. The method according to claim 26, wherein the second data transmission comprises transmitting a second data packet wherein the second data packet comprises the second time stamp.

29. The method according to claim 26, wherein the second time stamp is embedded in an overhead portion of a digital wrapping circuit.

30. A method, comprising:
generating a first time stamp associated with the first location;
transmitting the first time stamp associated with the first location in a first overhead of a first optical transport unit frame to a second location during a first data transmission via a network, wherein the first time stamp comprises information reflecting a round trip delay of the network;
receiving a second time stamp associated with the second location in a second overhead of a second transport unit frame during a second data transmission, wherein the second time stamp includes at least part of information of the first time stamp extracted from the first overhead of the first transport unit frame; and
processing the second time stamp associated with the second location to measure a round trip delay of the network.

31. The method according to claim 30, wherein the first data transmission comprises transmitting a first data packet wherein the first data packet comprises the first time stamp.

32. The method according to claim 30, wherein the second data transmission comprises transmitting a second data packet wherein the second data packet comprises the second time stamp.

33. The method according to claim 30, wherein the first time stamp is embedded in an overhead portion of a digital wrapping circuit.

* * * * *